(12) United States Patent
Cioe

(10) Patent No.: US 9,514,604 B1
(45) Date of Patent: Dec. 6, 2016

(54) SYSTEM AND METHOD FOR RANDOMIZED VIRTUAL GOLF GAME WITH WAGERING

(71) Applicant: InOv8 Golf, Inc., Scottsdale, AZ (US)

(72) Inventor: John M. Cioe, Scottsdale, AZ (US)

(73) Assignee: INOV8 GOLF, INC., Scottsdale, AZ (US)

( * ) Notice: Subject to any disclaimer, the term of this patent is extended or adjusted under 35 U.S.C. 154(b) by 0 days.

(21) Appl. No.: 14/927,925

(22) Filed: Oct. 30, 2015

Related U.S. Application Data

(60) Provisional application No. 62/208,339, filed on Aug. 21, 2015.

(51) Int. Cl.
    *A63F 9/00*     (2006.01)
    *G07F 17/32*    (2006.01)
    *A63F 13/573*   (2014.01)

(52) U.S. Cl.
    CPC ......... *G07F 17/3237* (2013.01); *A63F 13/573* (2014.09); *G07F 17/326* (2013.01); *G07F 17/3269* (2013.01); *G07F 17/3276* (2013.01); *G07F 17/3286* (2013.01); *A63F 2300/5553* (2013.01)

(58) Field of Classification Search
    CPC .............. G07F 17/3276; G07F 17/3269; G07F 17/3279; G07F 17/3286; G07F 17/3288; G07F 17/32; G07F 17/326; G07F 17/38
    See application file for complete search history.

(56) References Cited

U.S. PATENT DOCUMENTS

| | | | | |
|---|---|---|---|---|
| 4,760,527 A * | 7/1988 | Sidley | ............... | G07F 17/32 463/13 |
| 6,047,967 A * | 4/2000 | Murphy | ............... | A63F 3/0005 273/245 |
| 7,841,933 B2 | 11/2010 | Maul | | |
| 8,216,043 B1 * | 7/2012 | Perrone | ............... | G07F 17/326 463/16 |
| 8,313,363 B2 | 11/2012 | Maul | | |
| 2003/0160387 A1 * | 8/2003 | Drury | ............... | A63F 3/0005 273/245 |
| 2007/0087804 A1 * | 4/2007 | Knowles | ............... | G07F 17/32 463/16 |
| 2008/0032799 A1 * | 2/2008 | Hamilton | ............... | A63F 1/00 436/42 |
| 2011/0244952 A1 * | 10/2011 | Schueller | ............... | G07F 17/32 463/27 |

OTHER PUBLICATIONS

"Variations of golf", May 13, 2014,Wikipedia, <https://en.wikipedia.org/w/index.php?title=Variations_of_golf&oldid=608323820>.*
http://worldseriesofgolf.com/, accessed on Oct. 27, 2015.

* cited by examiner

*Primary Examiner* — Justin Myhr
(74) *Attorney, Agent, or Firm* — Cislo & Thomas, LLP

(57) ABSTRACT

A system and method for playing a multiple iteration, goal-oriented game with wagering involved at each iteration, such as in a golf wagering application. The system and method comprises providing a computer application to connect multiple users in a network to play through bet sequences and play sequences during multiple iterations of play such as each golf hole, wherein in each play sequence each user moves closer to the goal such as taking the lowest number of virtual strokes on a virtual golf hole. Players may win by reaching the goal before other players, or by causing opponents to drop out of a game during betting sequences.

19 Claims, 16 Drawing Sheets

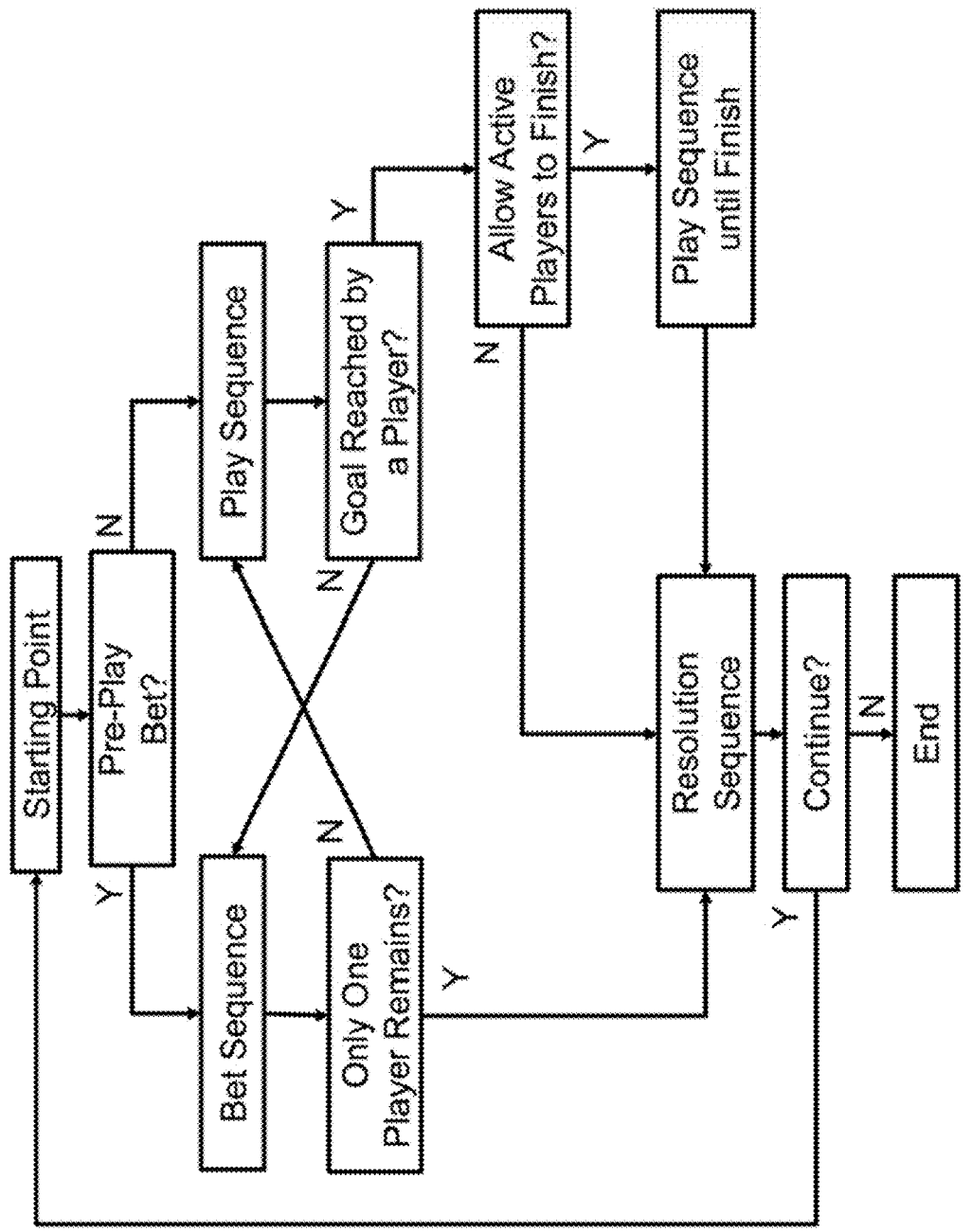

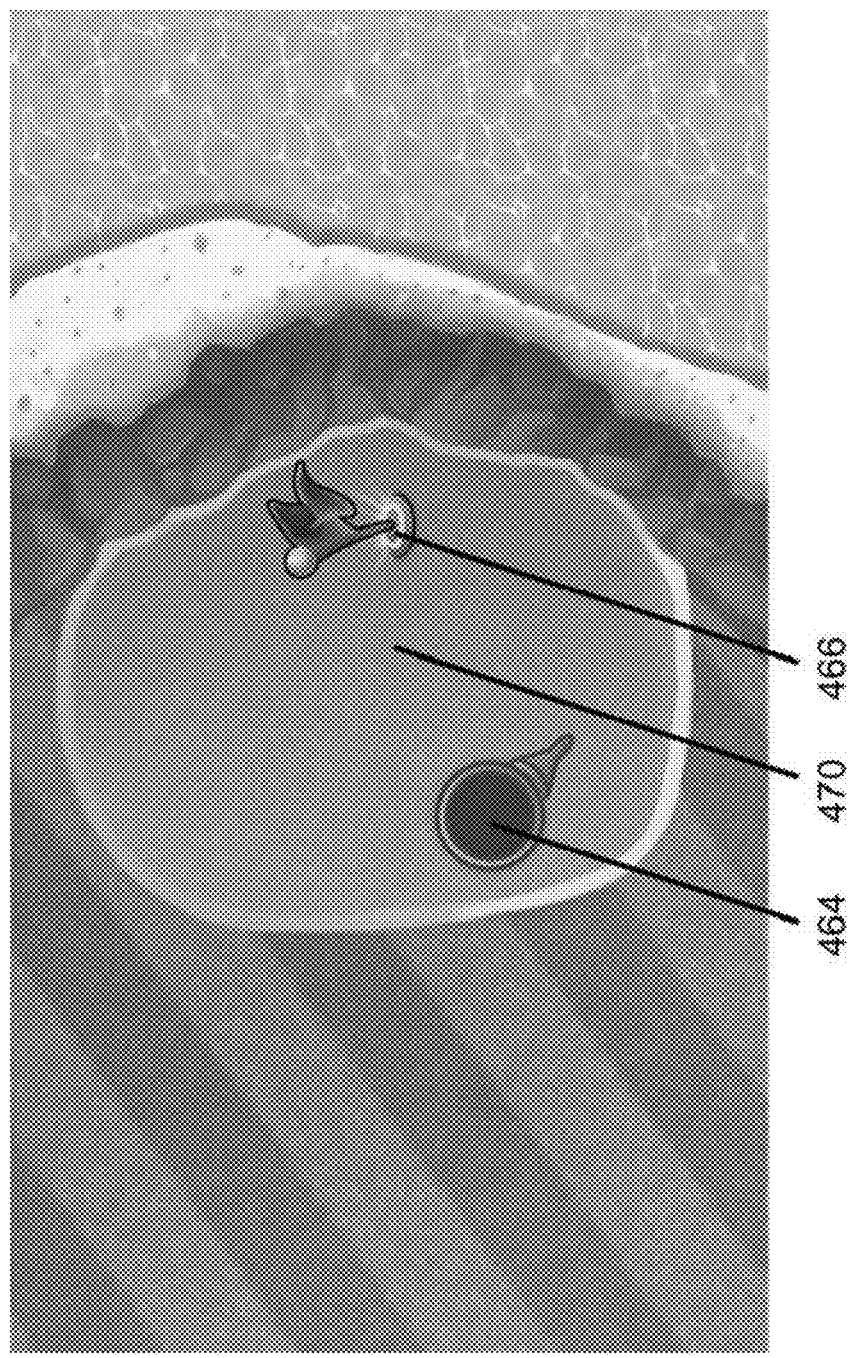

SYSTEM AND METHOD FOR RANDOMIZED VIRTUAL GOLF GAME WITH WAGERING

CROSS-REFERENCE TO RELATED APPLICATIONS

This patent application claims the benefit of U.S. Provisional Patent Application Ser. No. 62/208,339 entitled "Mobile Application Golf Game" filed Aug. 21,2015, which application is incorporated in its entirety here by this reference.

TECHNICAL FIELD

This invention relates to methods of playing multi-player games with wagering in multiple iterations.

BACKGROUND

Golf is a sport wherein multiple players take turns hitting balls in order to reach a goal—the hole. While golf is very popular, it requires substantial skill and commitment in order to play well. In addition, an 18-hole round of golf takes approximately 3-5 hours, representing a significant time commitment.

Many persons who play golf recreationally often place some money at stake through betting. Common golf betting routines include Nassau (low score on front nine, low score on back nine, and low score for the full 18 holes) and Skins (each hole has a particular dollar amount and ties carry over the "pot" to the next hole). Variations can be applied in which a foursome is split into two teams, and those teams can play best ball (lowest score by a team member represents the team's score on a hole), alternate shot (the players on a team alternate shots), or scramble (each player on a team plays a shot from the tee, and then each player plays a shot from the best position of the subsequent shots). There are numerous variations in the nature of betting golf, and the above list is not meant to be limiting or exclusive.

In fact, the United States Golf Association has a "handicap" or "index" system that provides golfers with a means of competing, and fairly betting, against each other even if they are not of equivalent ability.

In recent years, one of the more popular games to bet, in general, has been poker, including the "Texas Hold 'Em"-style of poker, where bets can be placed in multiple stages of a given hand of poker.

Similar to the "Texas Hold 'Em"-style of poker in which each hand constitutes the basis for a betting system, golf bets are often based on a hole-by-hole scoring system. Thus, while not previously recognized, there may be some applicability of a "Texas Hold 'Em"-style betting system and a round of golf. The major drawback to this concept, however, is that a round of golf takes a long time to play, and many persons who might enjoy betting in a golf context are unable or unwilling to devote a half of a day to such an endeavor, but would rather have a more time-effective, casino-like application of a "Texas Hold 'Em"-style betting system to golf.

To that end, with the advent of mobile applications and mobile games, it is now feasible to apply a "Texas Hold 'Em"-style betting system in a golf context in which an online, digital, electronic, mobile, or other similar platforms such as a virtual golf simulator or casino floor game, for a golf game can be infused with a betting scheme that is like "Texas Hold 'Em"-style poker betting.

With the immense popularity of golf, poker (including online poker), and online games, there is a need for a system and method of playing and betting golf that does not require a high skill level and time commitment needed for an actual golf game, but that maintains a high level of interest and enjoyment, and facilitates a betting scheme.

SUMMARY

The invention described herein is directed to a system and method of playing goal-oriented multiple-round games with wagering potentially involved in each round. The system and method comprises providing a computer application connecting players in a network wherein the players are capable of making wagers in multiple rounds of play, wherein each round of play advances each player towards a goal. Players win by reaching a goal in less iterations than other players, or by getting opponents to drop out of a game during betting sequences (i.e., folding).

More specifically, the invention described herein is directed to a system and method of playing a virtual, multi-player, golf game, featuring fictitious or actual golf courses, that includes the potential for wagering before each shot. The invention described herein may comprise an 18 hole round of virtual golf, but is not required to be 18 holes. Furthermore, each hole is independent in terms of wagering, and can be wagered in a "no limit" or "pot limit" context.

Prior to playing the game, each user may outfit his or her respective player with certain virtual golf equipment that may have its own characteristics that may affect shot outcome (e.g., distance, height, direction, spin).

Regarding the wagering process, for example, a four-person game can be played in which prior to teeing off on the first hole, two of the four players (which to they are may rotate) would pay an "ante" (the "small blind" and "big blind" in poker parlance), or all of the players could be required to pay an "ante"), and then each player could place a bet, call, or fold (although it would be unusual for a player to fold before any part of the hand is dealt, or any golf shot is hit in a virtual sense). Then, depending on the outcome of the initial tee shots, some players would be in better positions than others, and could increase the stakes, causing other players to fold, call, see the increased wager, or raise. Then, further shots on a given hole would be played, and the player with the lowest number of shots on a hole wins the pot. At the end of each hole, there is a resolution process in which the winner of the hole receives the "pot," and the other players have their accounts reconciled against what each lost. If there is a tie, the "pot" would be split among the winners of the hole. This process can be played out for each of the 18 holes on the virtual golf course. This process can also be augmented into a tournament format in which multiple groups of four people can compete in a larger tournament in a bracket-type format, or a format in which the top money winners in a given round of the tournament would move on to the next round for further competition.

The virtual golf game described herein may be based on gaming skill, betting skill, or both. In one embodiment of the game, the players shot outcomes are essentially randomized such that no gaming skill (i.e., ability to perform a physical manipulation of a mobile or other gaming device to hit a golf shot) is required, but betting skill is emphasized. In another embodiment of the game, the ability to perform a physical manipulation of a mobile or other gaming device may affect the golf shots played in terms of distance, direction, ball flight (draw or fade), and ball height (lower ball flight or higher ball flight). In yet another embodiment of the game, both gaming skill and betting skill may be required. Accordingly, there are at least several variations on the implementation of the game that would foster user enjoyment.

Regarding, the essentially randomized shot outcomes, a random number generator may be used wherein a player actuates an element such as a digital button, digital wheel, or digital "rollerball" to commence the golf shot, and upon such actuation, a random number generator generates a number that corresponds to an outcome for the shot. As set forth in greater detail below, there are numerous variables that can affect the shot outcomes base on the random number generator, and the random number generator can be correlated with specific shot outcomes based on the location and circumstances from where the shot is hit (e.g., fairway, rough, bunker, distance from hole).

Ultimately, based on the randomness, but specificity of possible shot outcomes, and the objective of obtaining the lowest score possible on a hole, the system described herein may be enabled with the capability of generating at each shot iteration a percentage likelihood of winning a given hole, thus, creating a risk-reward paradigm that will inform the player's wagering before a given shot. Furthermore, as the round progresses, and players' virtual (or real) cash fluctuates based on success or failure of wagering and playing earlier in the round, additional strategy regarding betting will exist.

Regarding the embodiment in which a physical manipulation is required to effectuate the golf shot, a digital "rollerball" or similar element may be used in which the velocity and direction of the spin of the digital "rollerball" may be measured and translated into a distance and direction for the golf shot. Player pre-sets for ball flight and ball height may also factor into the shot outcome.

In other embodiments of the game, whether one requiring gaming skill or not, additional permutations affecting success on a given hole may be applied. Such variations may include the presence of various cuts of rough (high grass) on the golf course, "plugged" lies in bunkers, green speeds, different types of grass (e.g., bermuda, kikuyu, zoysia), wind speed and direction, undulations (or breaks) on putting greens, playing a certain type of golf ball that is known to spin more or less or travel farther or shorter, using certain types of golf clubs that are known to have particular characteristics related to ball flight patterns. The presence of such conditions may be applied to the random number generator to affect the outcome of a given shot, and thus, a player's potential score on a hole.

Still further, it is envisioned that the golf courses used in conjunction with the invention described herein could be fictitious or virtual exemplars of real golf courses. Under either circumstance, the particular characteristics and terrain of the golf course could also be factored into the outcomes from the random number generator.

BRIEF DESCRIPTION OF DRAWINGS

FIG. 3 shows an exemplary flow diagram of a process in accordance with an embodiment of the present disclosure;

FIGS. 4A-4G show an exemplary computer implementation in accordance with an embodiment of the present disclosure.

DETAILED DESCRIPTION OF THE INVENTION

Figure 1:
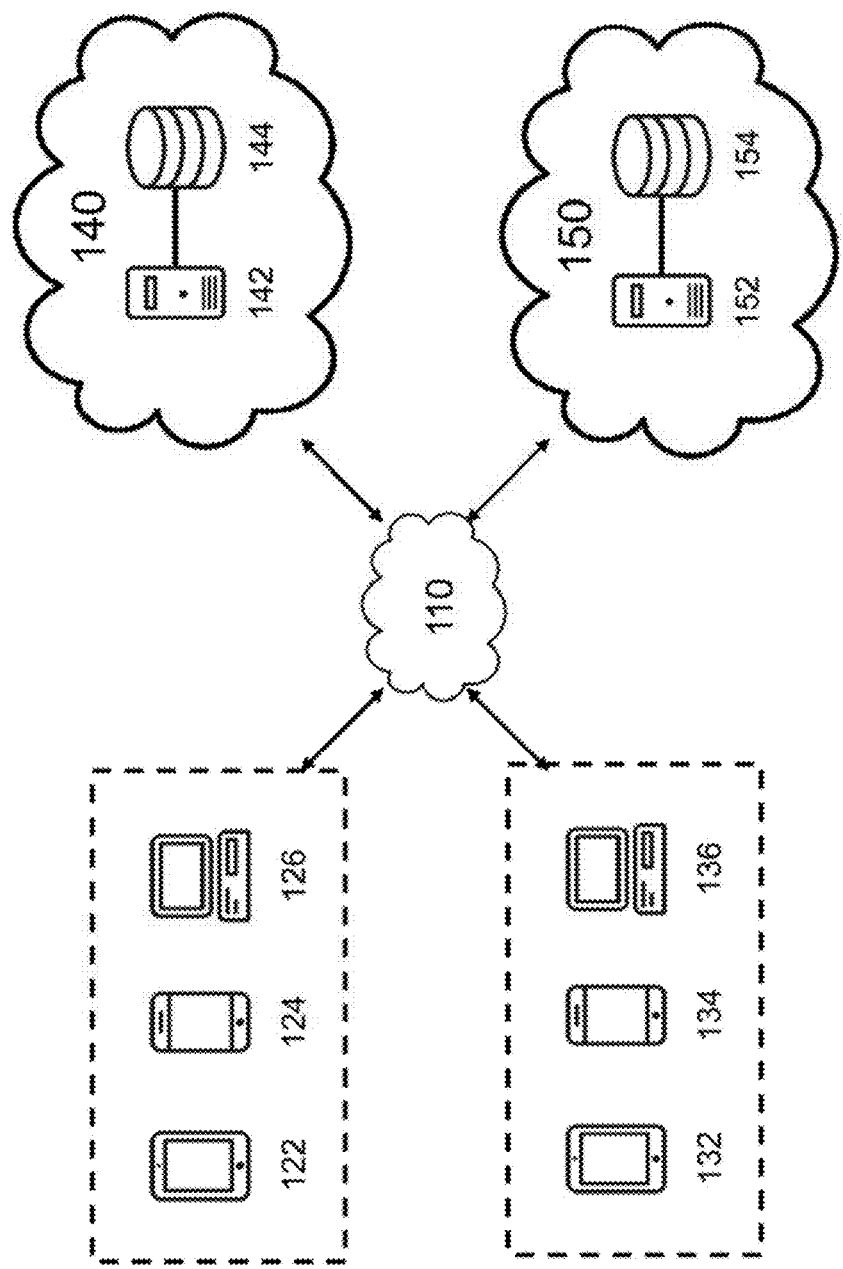
FIG. 1 is a diagram of an exemplary environment in which the present disclosure may be implemented.

The detailed description set forth below in connection with the appended drawings is intended as a description of presently-preferred embodiments of the invention and is not intended to represent the only forms in which the invention described herein may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first player could be termed a second player, and, similarly, a second player could be termed a first player, without departing from the scope of the invention described herein.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In various embodiments, the method steps described herein, including the method steps described in FIG. 3, may be performed in an order different from the particular order described or shown. In other embodiments, other steps may be provided, or steps may be eliminated, from the described methods.

The system of the invention described herein combines a multiple iteration, multi-player game of chance for a computing device wherein each player attempts to reach a termination point before other players, wherein players have an opportunity to bet each round and each player advances based on the outcome of a random number generator. By way of example only, the invention described herein is described herein as implemented as a golf game.

More specifically, the system of the invention described herein combines a multiple iteration (each iteration corresponding to a virtual golf shot), multi-player game wherein each player attempts to score the lowest score relative to the other players on each golf hole. While players are playing a given hole, each player has the opportunity to bet at each iteration (i.e., each golf shot), with each player's score on a given hole is based on the outcome of a random number generator, and each player's monetary (virtual or real) on a given hole is based on how each wagered during the course of a hole, and cumulatively during the course of the game (i.e., round of golf).

The collective environment for the system and method for playing the multiple iteration virtual golf game with wagering can be provided and accessed in a variety of forms. FIG. 1 illustrates an exemplary environment 100 in which the present disclosure may be implemented. A plurality of computing devices 122, 124, 126, 132, 134, 136 using proprietary applications may communicate with each other, system server 142, system database 146, third party server 152, and/or third party database 154 in a computing environment in order to facilitate a method of playing the multiple round gambling golf game.

As illustrated in FIG. 1, a first user at a computing device 122, 124, 126 having a proprietary computer application, accesses system servers 142 via a network 110. The servers 142 can provide multiple services. For example, the server 142 can provide interfaces for account creation, database access, third party social network access, game hosting, and other such features. The database 144 stores information, such as user information, social network, and virtual currency. The server 142 and database 144 could be accessible from computing devices via a network 110, such as the Internet or cellular network. While only one server 142 and database 144 are depicted, multiple servers and databases may work together in a collective computing environment 140.

In some embodiments, the server comprises an application server for communication with computing devices 122, 124, 126, 132, 134, 136. Examples of computing devices include, but are not limited to, tablets 122, 132, smartphones 124, 134, and desktop computers 126, 136 (or known variations thereof, such as laptop computers, phablets, and the like). In some embodiments, the computing device may include arcade cabinets or gambling machines in a casino connected via an internal network to an internal server. In other embodiments, the computing device may include a golf simulator machine.

In some embodiments, the server interfaces with a digital contacts application and/or third party servers 152 of social networks in order to establish social contacts for connecting various users of the system. For example, after a user creates an account, a user can choose to import contact phone numbers from a mobile phone 124 or from a social network such as Facebook in order to find users to interact with on the social network.

Figure 2A:
FIG. 2A-2F show an exemplary computer implementation in accordance with an embodiment of the present disclosure.

FIGS. 2A-2F show examples of computer implementation in accordance with an embodiment of the present disclosure. FIG. 2A illustrates an example home screen. As illustrated, the home screen comprises an option to join a match 202, a display of the user's virtual currency 204, and options to manage the user's user account. For example, the user may select a settings option 208 to view the user's profile and settings, a locker option 210 in order to customize an avatar (which may correspond to a fully clad golfer), a pro shop option 212 in order to view and purchase goods or benefits, a social network option 214 to view and manage connections in a social media network, and a notice option to view the latest news and updates about the game, such as promotional events or daily challenges and rewards.

Figure 2B:
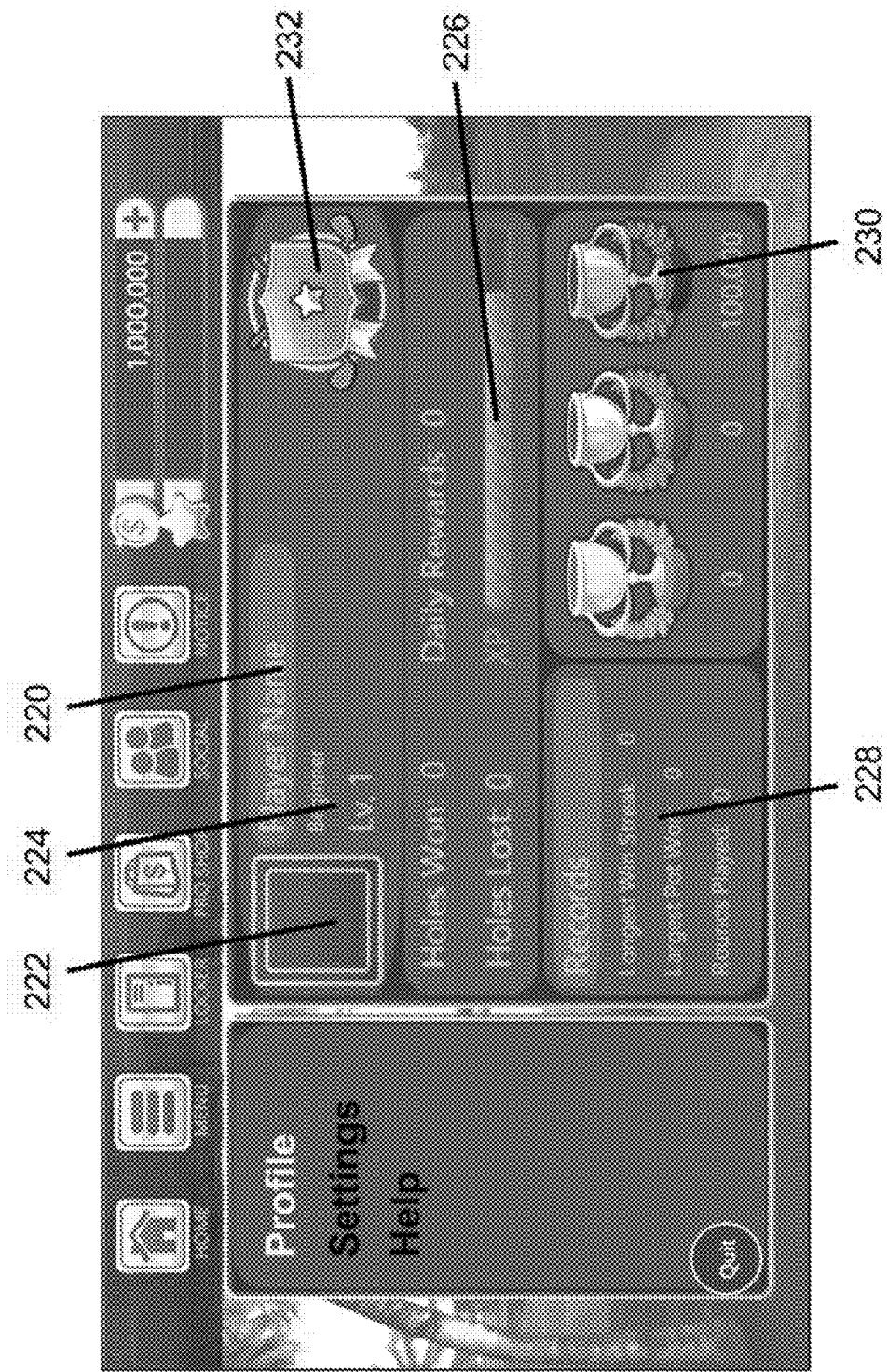

FIG. 2B shows an exemplary embodiment of a settings tab of a user account. As illustrated, the settings tab may comprise a user profile. The user profile may comprise a user's name 220, a representative picture 222, a user's status or title 224, a user's progression level 226 through the game, statistics 228, and other information relating to the user account. As shown, a player may earn trophies 230 and badges 232 to display in the profile.

The user's progression level may reward the player with prizes. For example, each level may reward a player with trophies, badges, titles, customization options for the player's avatar, virtual currency, and/or qualifications to enter special promotional events. For example, in order to join a special tournament, a user may have to have attained a given level (e.g., level five) as a prerequisite for entering a particular tournament. In some embodiments, joining a special tournament may provide additional progression, achievements, and rewards. In other embodiments, virtual golf equipment (e.g., balls, clubs, etc.) may be available for purchase, and may be used to increase a user's level or ability if purchased or downloaded.

Figure 2C:
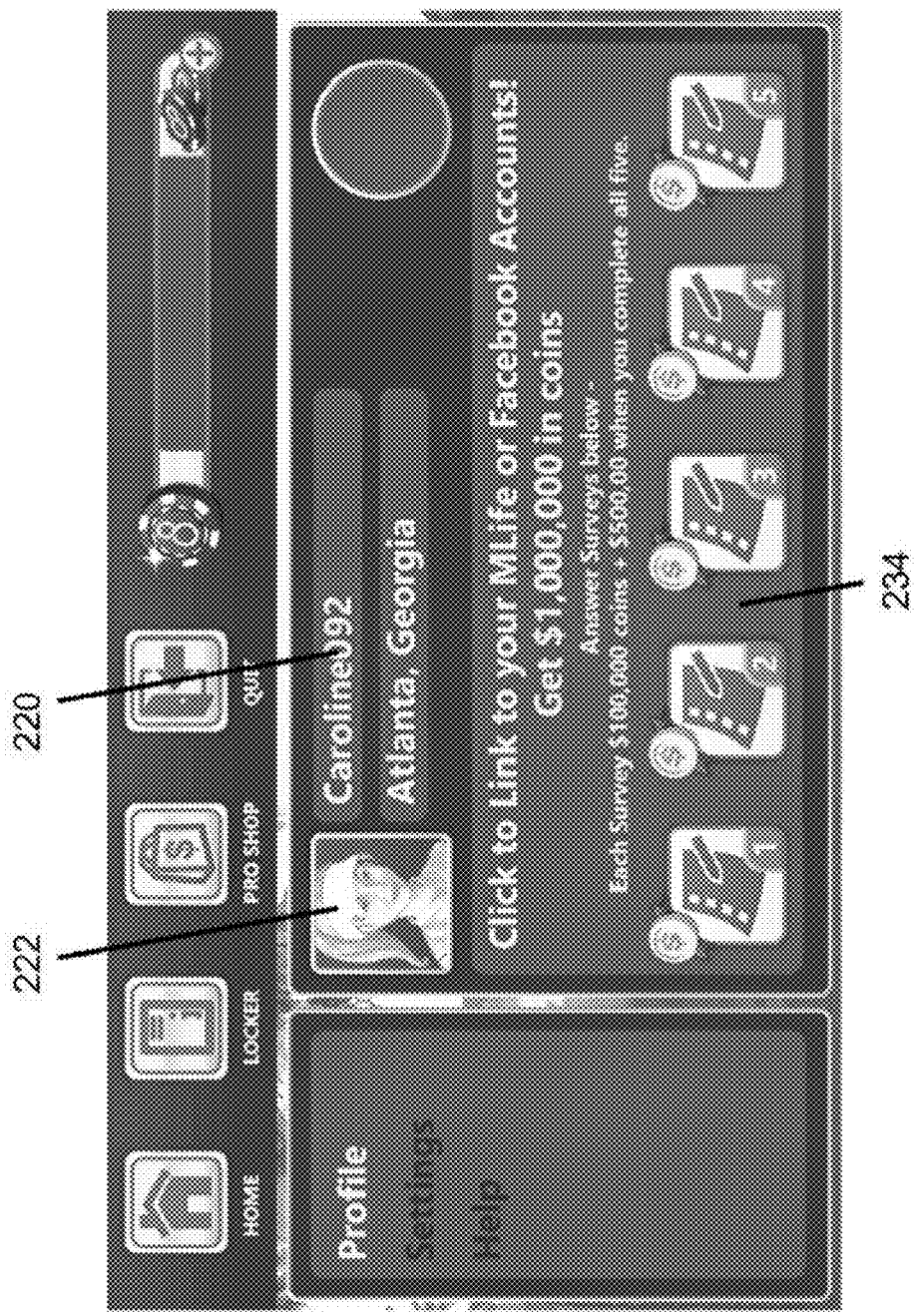

Additional features may be implemented in order to reward a player with progression or virtual currency. For example, as illustrated in FIG. 2C, linking a user account to a social media network or taking surveys 234 may reward a user with benefits tied to the user account.

Figure 2D:
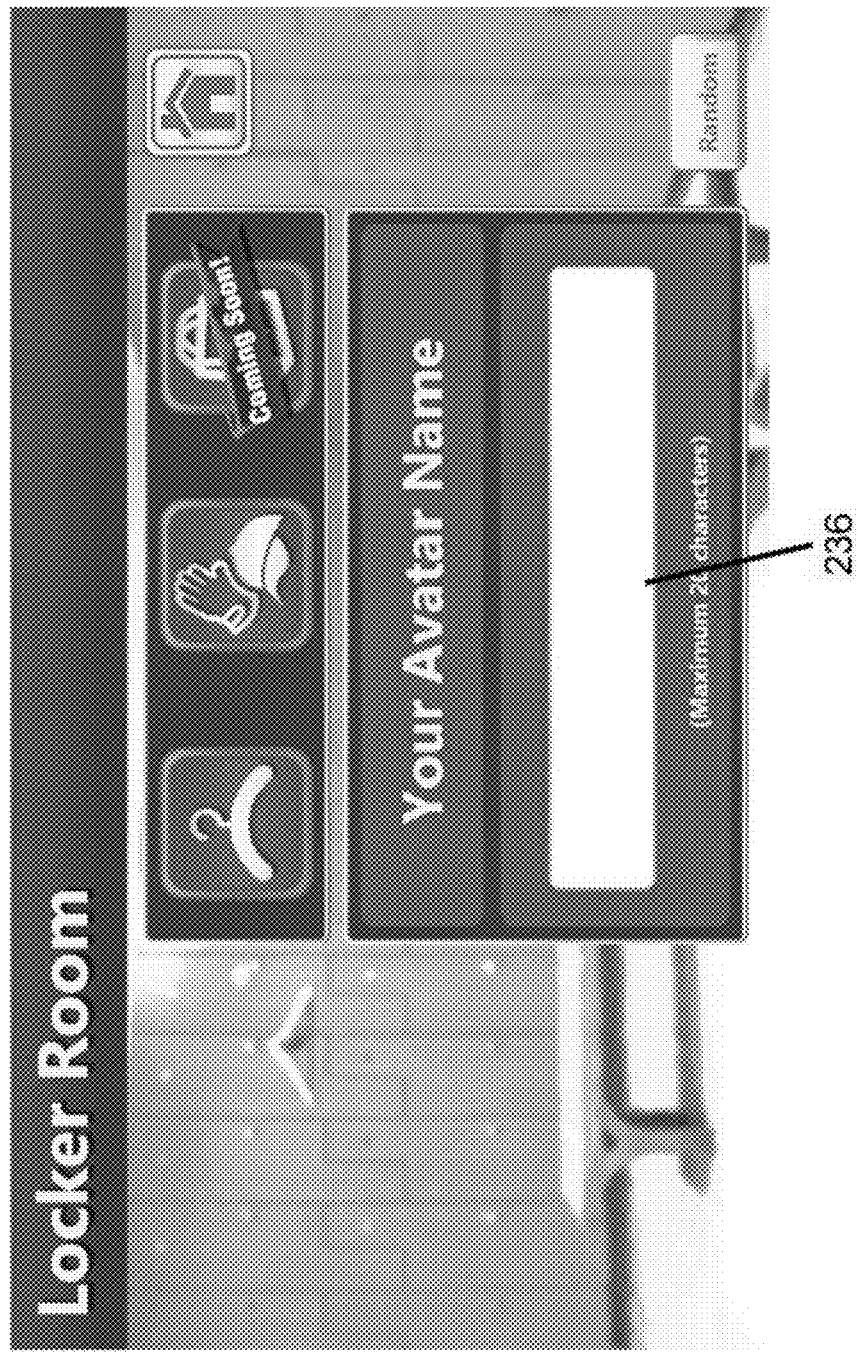
Figure 2E:
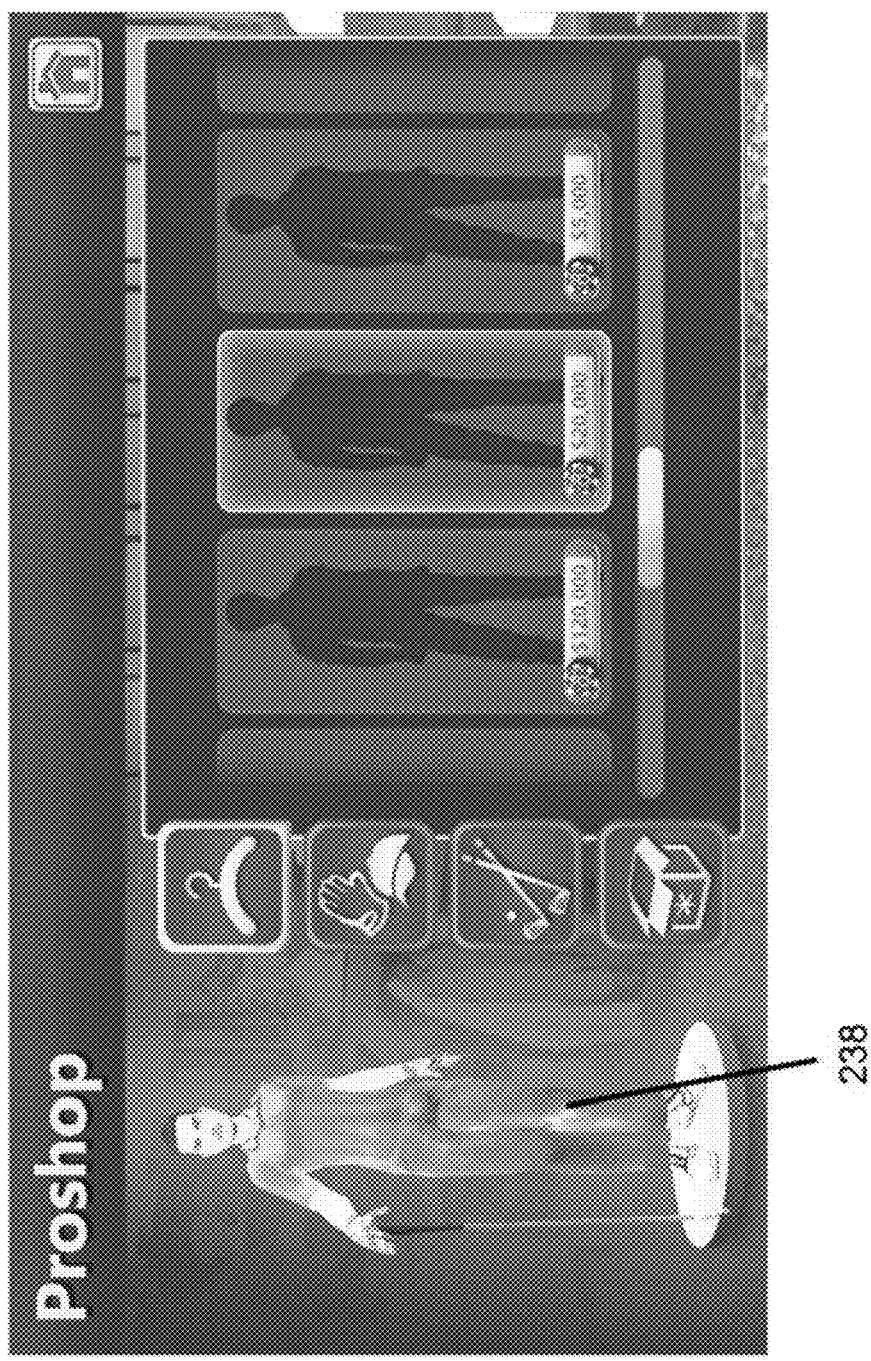

FIGS. 2D and 2E show example locker room and avatar customization options. As shown, the player may choose to customize an avatar 238 to represent the user when playing games with other people. The avatar 238 may have a name, and may have customizable features and accessories. For example, the avatar 238 may be modified by a selection of sex, skin, hair, shirts, pants, shoes, hats, gloves, golf clubs, golf balls, and the like. In some embodiments, customizable features are unlocked by advancing in the progression system. In some embodiments, customizable features are unlocked by specific tasks, such as winning five games in a row. In some embodiments, customizable features may be purchased through virtual currency and/or real currency. In some embodiments, customizable features may be won by participating and/or winning in special promotional events. In some embodiments, the avatar 238 may also be shared via social network. These customization features are prefatory to actually playing the game, but may be an important feature related to monetization of the application or creating "tie-ins" with known golf companies or facilities related to the golfing industry.

Figure 2F:
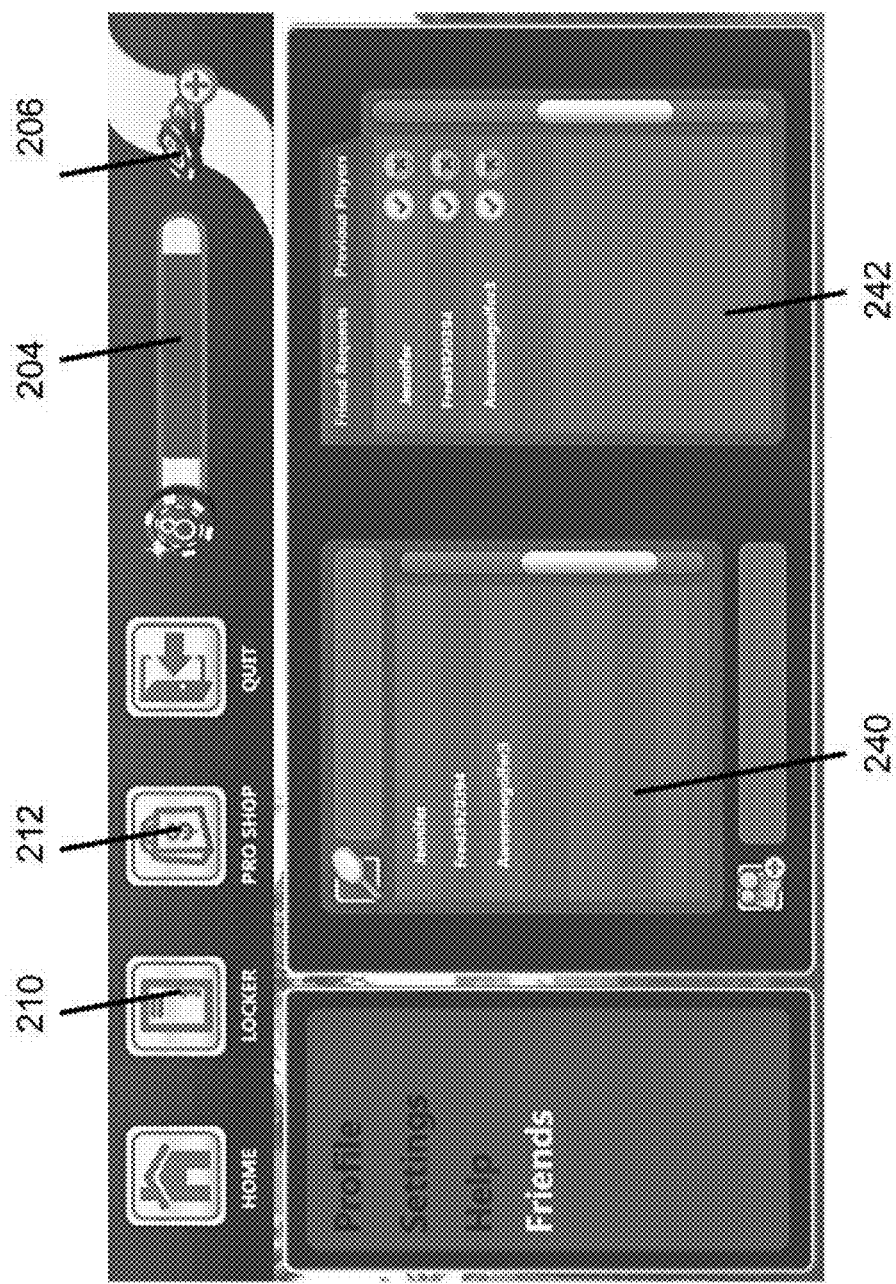

As shown in FIG. 2F, a social network may also be used to allow a user to play games with other members of the social network. In some embodiments, contact information may be imported from a user's phone or from a third party social network in order to invite players to the system. The contacts or friends are displayed in a friends list 240. Pending Invites are shown in a pending requests list 242. The friends list may be used to see which players are online and may be invited into a game of virtual golf. In some embodiments, a user may achieve rewards for successfully inviting a member of a social network to join the system.

As shown in FIG. 3, a game comprises a starting point, a bet sequence, a play sequence, a termination condition or event (of which there is more than one type), and a resolution event. When users decide to begin a game, each user is put in a starting point with the other users before proceeding to game actions. After paying an initial ante into the pot, the players proceed to alternate between bet sequences and play sequences until a termination condition occurs. In this example embodiment, a termination condition occurs when one player remains during a bet sequence or a player reaches the goal during a play sequence. After a termination condition occurs, the pot is resolved at the resolution event and distributed to one or more winners. If the players choose to continue playing and meet the conditions of having the ante amount, they may continue on to a new game with a new starting point. In some embodiments, if the termination condition occurs during a play sequence, players are given the option to continue the play sequence without bet sequences in order to end the hole. In some embodiments, the numbers of strokes per hole are aggregated into a final score. In some embodiments, folding during a bet sequence automatically assigns a number of strokes for that hole.

Lobby Sequence

Figure 4A:

Prior to joining a virtual game described herein, users are put in a lobby sequence before proceeding. As shown in FIG. 4A, a lobby allows the user to select what type of game to play. In some embodiments, the user may create a game 401 or join a game 403. Game selections may have customizable settings. For example, games may differ in buy-in amount, blind, minimum/maximum wagering limits, number of players, game type, and which players are in them. In some embodiments, the user is matched randomly with other users. In some embodiments, the user is matched with social network contacts. As shown, filters may allow a user to search for particular types of games, such as games that are not full 407, or games that include at least one friend on the user's friend list 405. In some embodiments, the user may search and enter into a larger tournament that requires multiple games to be played to determine an overall tournament winner.

Starting Point

Figure 4B:
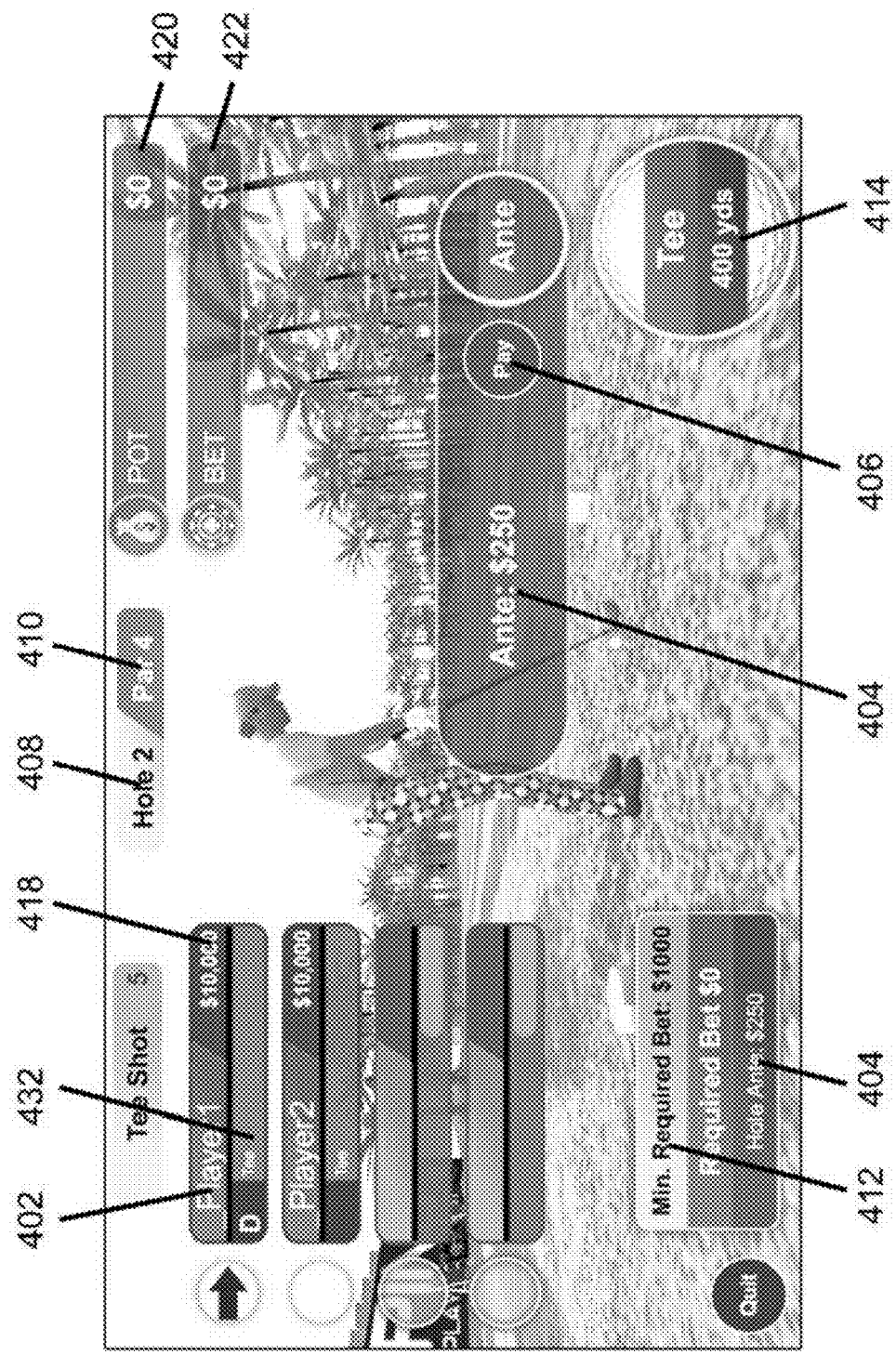

FIG. 4B shows an example starting point screen, in this case a hole commencement screen, representing the beginning of each hole. This hole commencement screen displays each player 402 currently playing the game, the ante amount 404 required to be part of the game (as to a particular hole), and an option to pay the ante 406. During this stage, some embodiments may include an option for pre-play wagering separate and apart from the ante and the bet sequence. In other words, players can make wagers prior to commencing play on a given hole.

The hole commencement screen also shows each player's ball position 432, the hole number 408, the par for the hole 410, the minimum required bet 412, and the distance of each player to the hole 414, and a visual depiction of the hole (from the perspective of where the user is on the hole, although other views such as overhead or perspective views are also contemplated). The hole commencement screen further shows each player's current cash on hand 418, the current pot 420, and amount of highest bet per bet sequence 422.

Figure 4C:
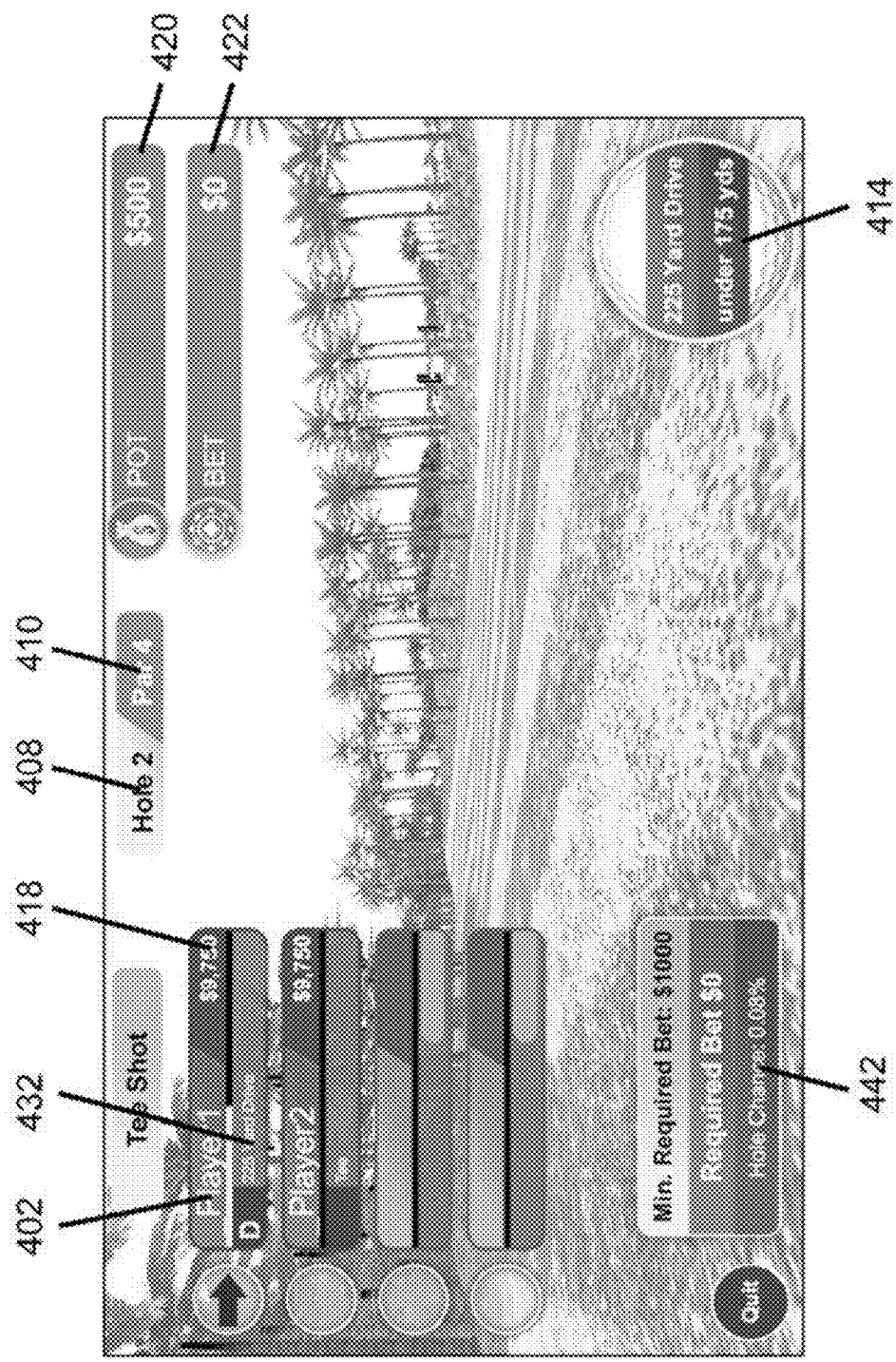

FIG. 4C shows an example screen representing a hole in progress after players have paid the ante. The paid ante is deducted from the player's cash reserves 418 and is aggregated in the virtual pot 420. This screen also indicates the location of each player's ball 432 on the hole, the distance of the shot, and the chance to reach the hole 442. This screen may also have an optional further betting indication.

In some embodiments, the game proceeds to a bet sequence after the lobby sequence. In other embodiments, the game proceeds to a play sequence after the lobby sequence. The game alternates between bet sequences and play sequences until a termination event occurs.

The pot holds the "ante" and the wagers that each player makes throughout the match, typically on a hole-by-hole basis. The pot is rewarded after a termination event occurs (i.e., the end of a given hole). A termination event occurs during the bet sequence if one player remains active, or if one player wins the hole. If more than one player, but less than all players, win the hole via a tie, the pot is divided evenly amongst those players. If all players tie on a hole, the pot may be evenly divided among the players, or each player's ante money and money wagered may be returned to the player. In one embodiment of the invention described herein, if the termination condition occurs before each active player completes the golf hole, one option is for the system to allow the active players that did not complete the golf hole to complete the golf hole.

Bet Sequence

During a bet sequence, each player plays sequentially one after the other. For example, the order may be determined based on the order the players entered a game lobby and joined the game. In another embodiment, and more akin to real golf, a the order may be determined by the distance a player is from the whole, with the player furthest from the hole having to bet first.

Figure 4D:
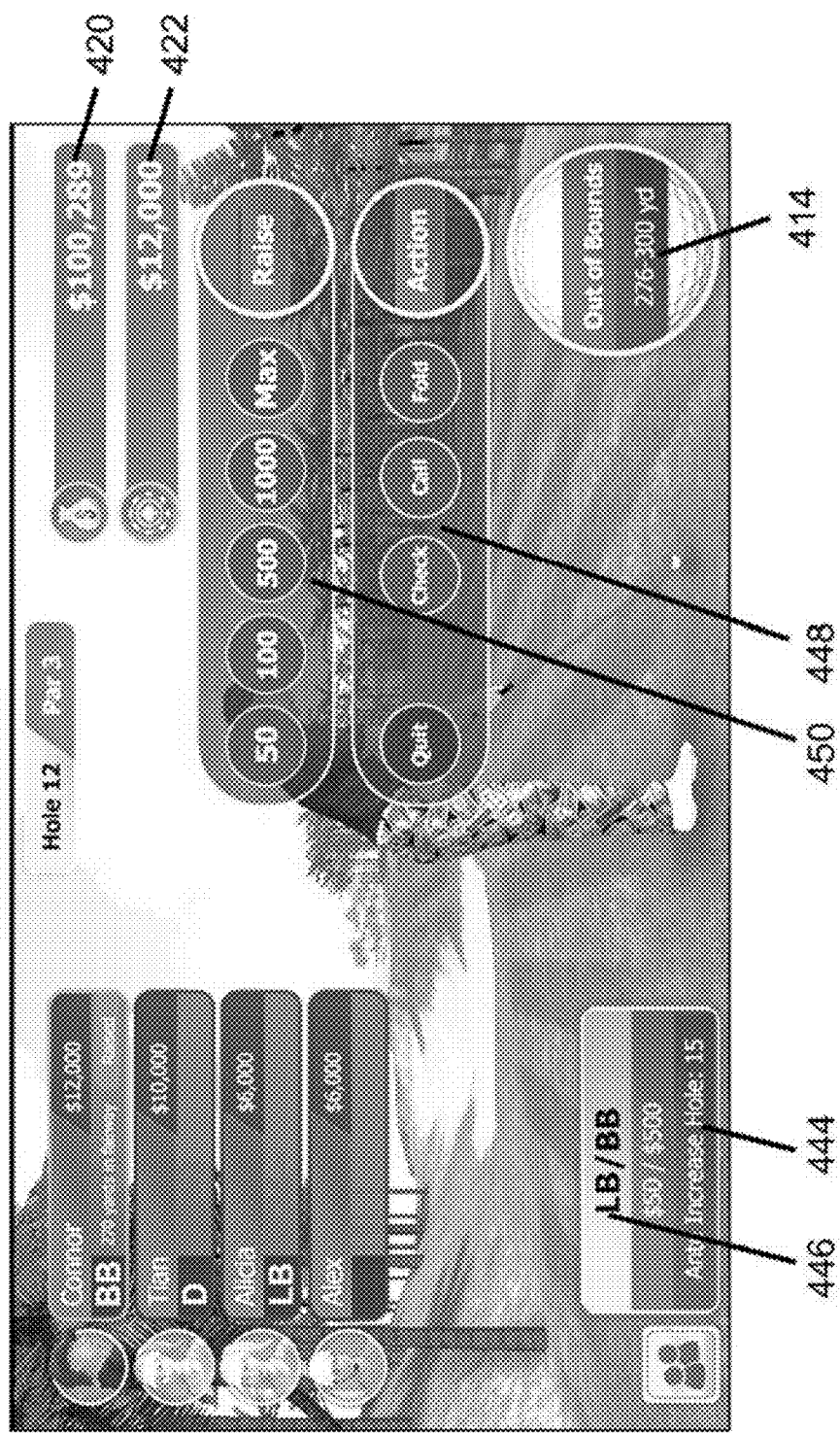

FIG. 4D illustrates a player wagering screen during a bet sequence. In this example embodiment, options for wagering 448 are displayed allowing the user to check, call, fold. The player may additionally raise the amount of the bet, with options for different betting amounts 450 shown. FIG. 4D also shows the "little blind" and "big blind" amounts 446, as well as an indication 444 that the per hole "ante" will increase on a future hole.

Players may bet in advance of each shot, although some embodiments of the present invention may exist in which players are not permitted to bet prior to the tee shot.

During a player's turn, the player may choose among several options regarding wagering, such as check, fold, raise, and call. Check allows a user to stay active in the game without betting if no one had previously raised in that particular sequence. Fold makes a user inactive, thus forfeiting any chance at winning the pot. Raise increases the wager amount the player puts in the pot. Call matches the highest amount put in by previous players. The betting phase continues in conjunction with each player taking a shot, and lasts until every player has chosen to fold and become inactive (by losing a hole or by running out of money). At the end of each hole, a resolution event occurs in which the winner(s) of the hole receive the money in the pot.

In some embodiments, each player has a timer to limit the time allowed to choose a move. In some embodiments, if a player does not play within the time limit, the player automatically folds. In some embodiments, if a player does not play within the time limit and no player has raised, the player will automatically check. In some embodiments, the set of choices may include a "check/fold" choice which automatically chooses check on the player's turn if another player has not chosen raise, and chooses fold if another player has chosen to raise.

Play Sequence

During the play phase, each active player progresses on a golf hole based on outcomes based on a random number generator. Each hole may indicate the par for the hole. The par for the hole may influence a user's betting strategy. For example, for a higher par for the course, a player may believe there are more betting iterations to use to try to place themselves in a position to win or tie a pot, or to "bluff" to cause other players to fold. In another example, a player may believe that a higher par for the hole means the player would be required to invest more money to gamble in a situation.

In some embodiments, a random number generator generates a single random number and each player's golf shot depend on the single number generated. For example, a shot outcome may be based on a table that considers the number of players and have predetermined movements for each player based on the random number generated. In other embodiments, the random number generator generates a random number for each player, and each player's shot outcomes are determined by the random number generated according to a table.

In some embodiments, the player's possible shot outcomes can be made to depend on the location from which the ball is hit. For example only, the ball may be located on a fairway, bunker, rough, or putting green. In some embodiments, a ball hit from a fairway may have a greater possibility than a ball hit from a bunker or rough to travel a greater distance, which could significantly impact betting strategy and outcomes on a par 5 hole. In some embodiments, a ball hit from a bunker may have a larger range of possible movements and angles compared to a ball hit from a fairway, which can be predetermined to have less variety in shot outcome.

In some embodiments, the player's possible shot outcomes may depend on the distance of the ball from the hole. For example, the distance from the hole may determine a type of golf club used, which determines the possible distance and accuracy of the shot.

In some embodiments, additional variables may affect a movement set. For example, a wind direction and speed may be determined by a random number generation. This variable may remain constant between rounds, or may change for each round or each player.

More specifically, for each shot on each hole, a random number generator, or analogous feature, is tied to a shot outcome. For example, if the game was set up to have 15 outcomes per shot, then a random number generator would provide for 15 possible outcomes to the first shot on a hole (i.e., the "drive"). The outcomes may vary by distance of the drive, whether the drive is in the fairway, rough (including variations for first cut, intermediate cut, and "primary" rough), trees, bunker, water, or out of bounds. The outcomes may also vary by whether the shot is to the left or right.

Then, if the hole is a par 4 hole, the second shot outcomes may be similarly generated for each possible outcome of the drive. That is, a 250 yard drive in the fairway would have 15 possible outcomes. The same process is applied for putting, chipping, greenside bunker shots, etc.

To more closely simulate real golf, a specified number of possible outcomes from 1-15, from the above examples, could be correlated to the same outcome to increase the percentage chance to obtain a more realistic result. For example, a second shot after a 250 yard drive in the fairway on a 400 yard par 4 hole would have a relatively high likelihood of being hit onto the putting green. As such, a substantial number of the 15 numbers could be correlated to being hit onto the putting green.

Furthermore, if, continuing the example, 9 of the 15 numbers were correlated to the second shot winding up on the putting green, that outcome could be further specified by correlated those same 9 numbers with a given proximity to the hole.

Finally, regarding putting, the same general descriptions for the golf shots above apply. The closer one is to the hole, the more likely that a putt will be made, and vice-versa. It is possible that undulations in the putting greens can be incorporated into the shot outcomes for putts via the random number generator.

Figure 4E:
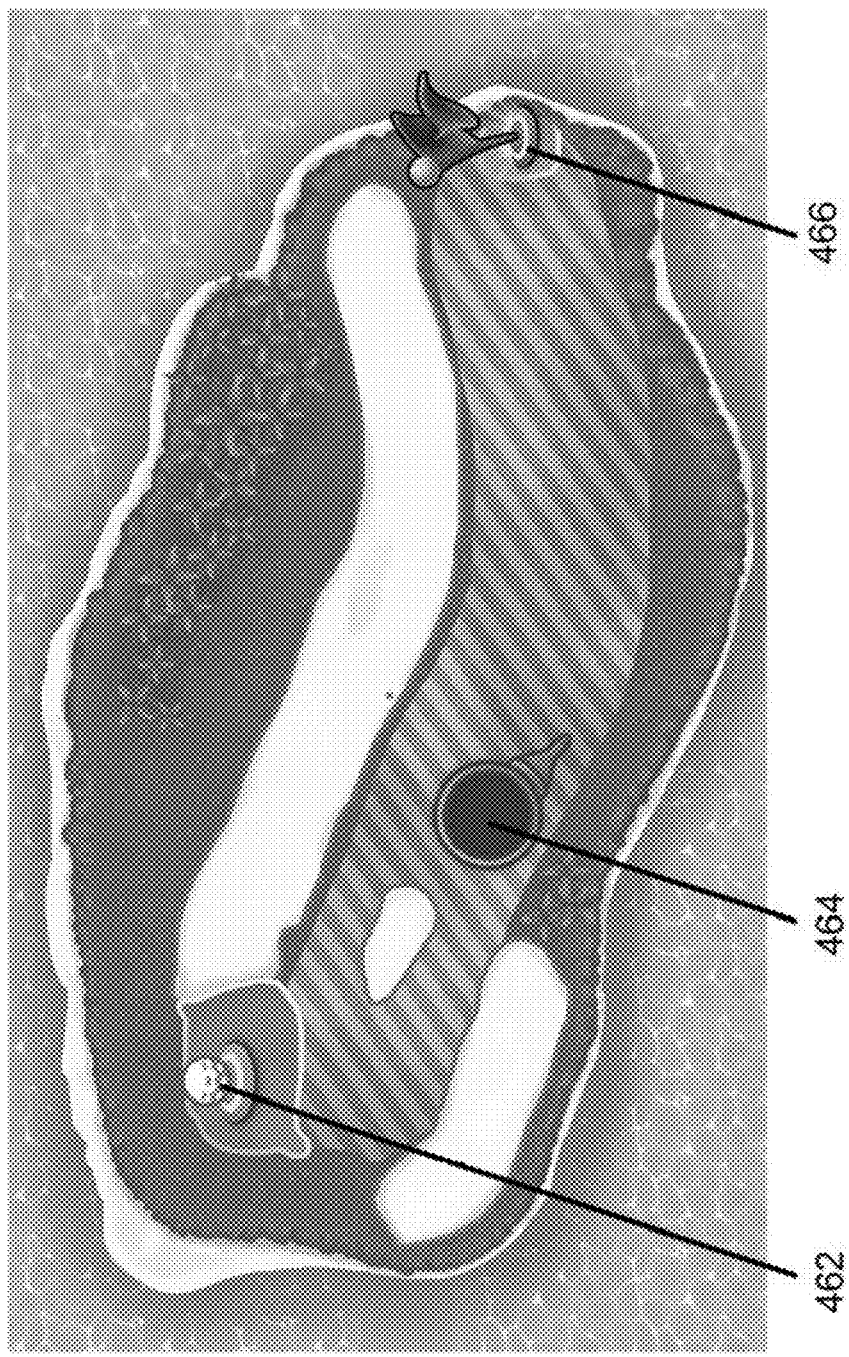

FIGS. 4E and 4F show an example map progression of a player. These show a tee location 462, a player's ball location 464, a green 470, and the goal 466. A map display may be used to show a player's progression and distance to the goal (i.e., the hole), as well as showing the relative distance of each player on the map. In some embodiments, an animation may be shown in the display showing a ball's flight after it is hit. In some embodiments, an overlay may be displayed to show the likelihood of a ball being hit in or past a certain area. In some embodiments, obstacles and wind direction may be indicated to further indicate to the player the likelihood of certain outcomes.

Typically, the game is played based on standard stroke play scoring. The game may be configured, however, to utilize match play, Stableford, or other known scoring systems, as well. Furthermore, the game may be configured to allow for team play, and invoke team scoring systems such as four-ball, best ball, scramble, or other known scoring systems.

Additional permutations affecting the result of a given shot may be applied. Such variations may include the presence of various cuts of rough (high grass) on the golf course, "plugged" lies in bunkers, green speeds, different types of grass (e.g., bermuda, kikuyu, zoysia), wind speed and direction, undulations (or breaks) on putting greens, playing a certain type of golf ball that is known to spin more or less or travel farther or shorter, using certain types of golf clubs that are known to have particular characteristics related to ball flight patterns. The presence of such conditions may be applied to the random number generator to affect the outcome of a given shot, and thus, a player's potential score on a hole.

Resolution Event

Figure 4G:
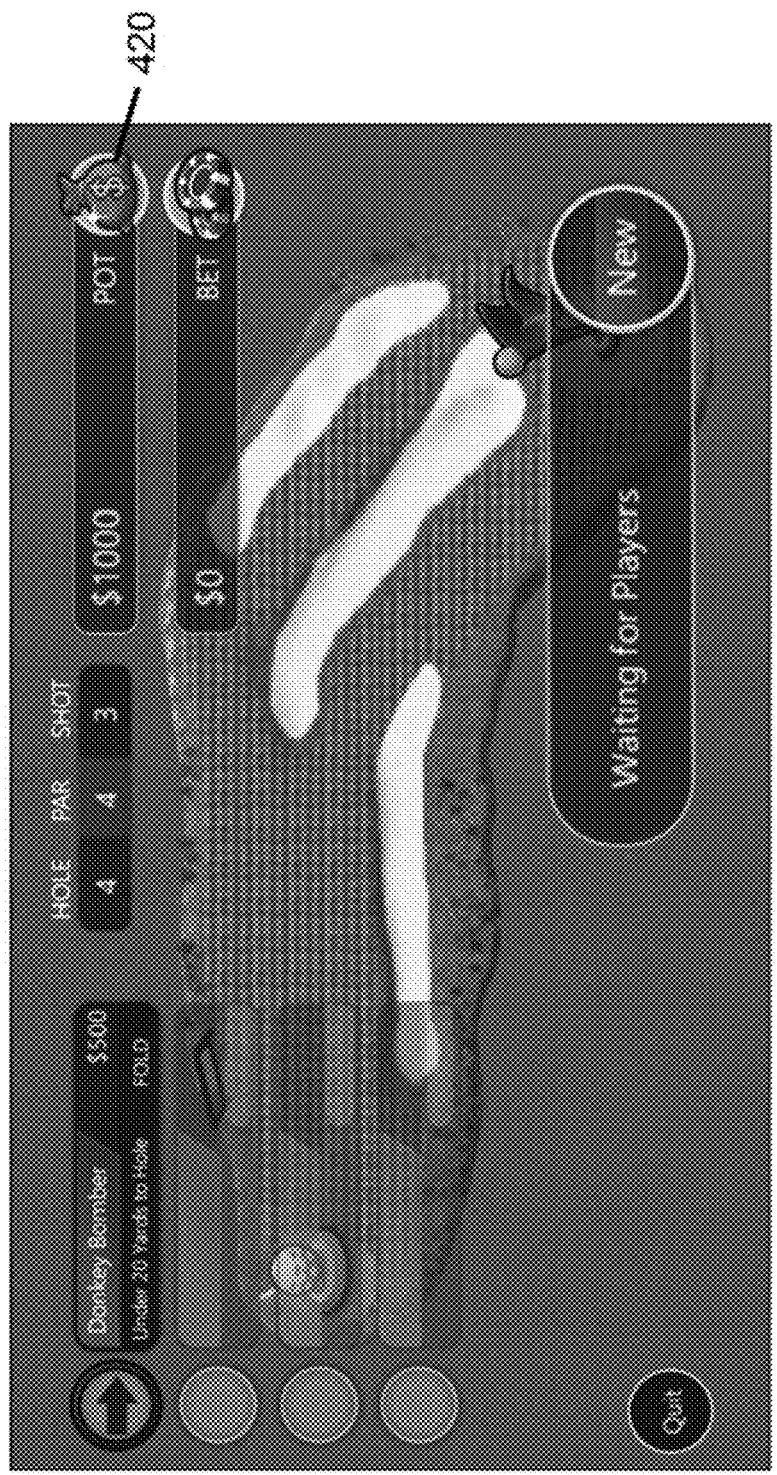

When a termination condition or event occurs, such as when one or more players have "won" the hole, or when all players except one have folded before the end of the hole, a resolution event is triggered that resolves the money distribution from the pot. FIG. 4G shows an example resolution screen. The resolution event occurs after each golf hole once there has been a termination condition or event. As shown in FIG. 4G, the virtual currency in the virtual pot 420 is shown and distributed to the winner(s) of a given hole. A user is a winner if the user is the only active user left in the game, or the user reached the goal of winning the hole. In instances where multiple users reach the goal of winning the hole during the same play sequence, the pot is distributed evenly among the winners. If all players tie on a hole, the pot may be evenly divided among the players, or each player's ante money and money wagered may be returned to the player.

In some embodiments, players may be given the option to continue play sequences in order to finish the hole, if the player has not finished. No more bet sequences are initiated, but the players may finish in order to obtain closure by finishing a hole. In some embodiments, only active players are allowed to finish the hole. In some embodiments, both active and inactive players are allowed to finish the hole. In some embodiments, the play sequences are not shown, but the final stroke count are calculated.

In some embodiments, the user may then choose to continue to the next hole with the same players, or to quit back to a home screen. If a user decides to quit, other users may see the player's name removed at the resolution event.

In some embodiments, the resolution screen also displays advances in a user's progression system, such as how much experience a user has earned, or if the user has completed a challenge. In some embodiments, the resolution may also provide options of adding players to a social network.

Tournament Mode

In some embodiments, the system may provide a tournament mode. A tournament mode comprises multiple golf games with a set of users. In the tournament mode, each user enters a set buy-in amount of virtual currency to be used in the tournament. Each golf game requires an ante. Even if users become inactive during a golf game, all users with the virtual currency for the ante become active again in the next golf game. The tournament continues until the set number of golf games has concluded or until only one user can afford the ante. If a user cannot afford the ante, the user is completely eliminated from the tournament. The user with the highest amount of virtual currency at the end of a tournament is deemed the winner. In some embodiments, the ante may increase as the rounds progress. In some embodiments, the minimum bet may increase as the rounds progress. A tournament may be designed in numerous ways, such as a bracket challenge, teams, top individuals in each round move on, or the like.

In some embodiments, the tournament may reflect an actual golf course. Users may be eligible to win prizes related to the golf course, such as branded virtual or real merchandise, achievements, titles, and/or trips to the golf course.

Computer Hardware

Systems, apparatus, and methods described herein may be implemented using digital circuitry, or using one or more computing devices using well known computer processors, memory units, storage devices, computer software, and other components. Typically, a computing device includes a processor for executing instructions and one or more memories for storing instructions and data. A computing device may also include, or be coupled to, one or more storage devices, such as one or more magnetic disks, internal hard disks and removable disks, optical disks, etc.

Figure 5:
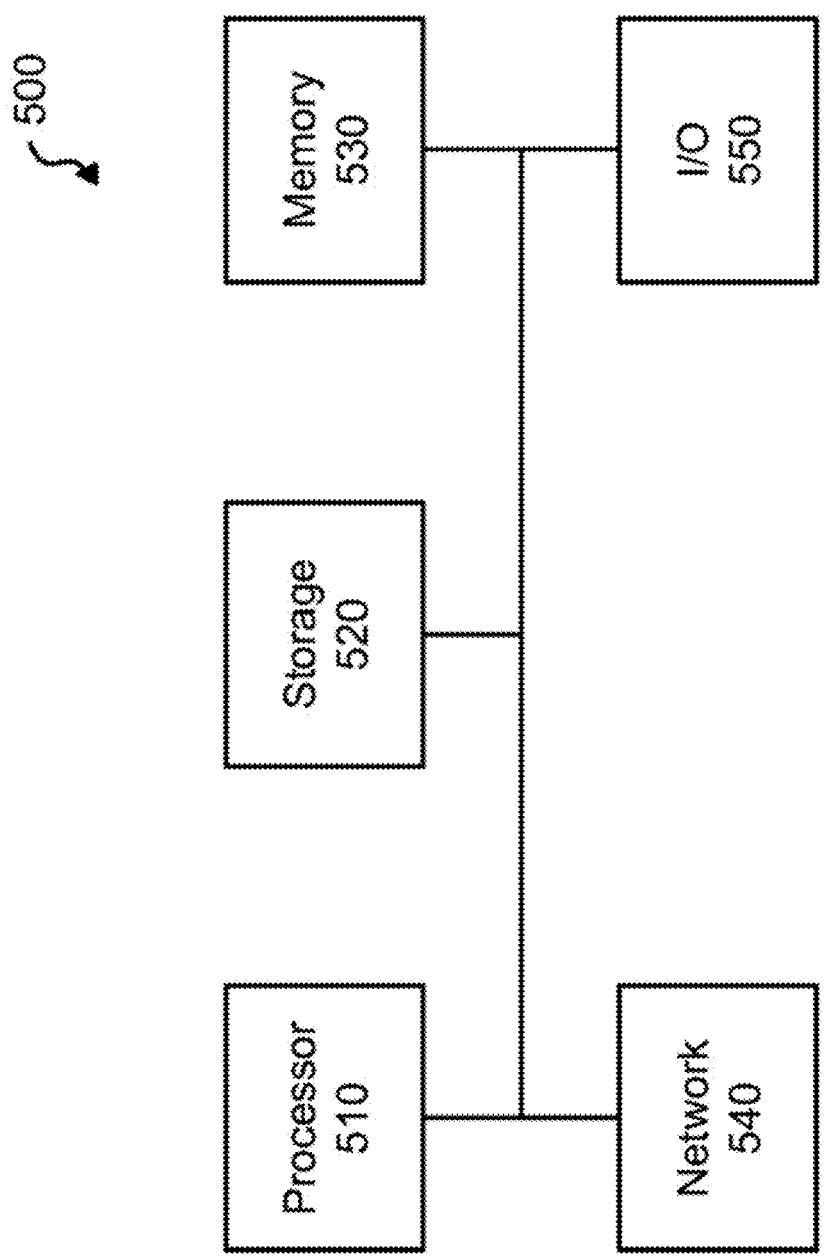
FIG. 5 shows a high-level diagram of a computing device that may be used to implement various aspects of the present disclosure in certain embodiments.

A high-level block diagram of an exemplary computing device 500 that may be used to implement systems, apparatus, and methods described herein is illustrated in FIG. 5. The computing device 500 comprises a processor 510 operatively coupled to a data storage device and memory. Processor 510 controls the overall operation of the computing device 500 by executing computer program instructions that define such operations. The computer program instructions may be stored in data storage device 520, or other non-transitory computer readable medium, and loaded into memory 530 when execution of the computer program instructions is desired. Thus, the method steps of FIG. 3 can be defined by the computer program instructions stored in memory 530 and/or data storage device 520 and controlled by processor 510 executing the computer program instructions.

For example, the computer program instructions can be implemented as computer executable code programmed by one skilled in the art to perform an algorithm defined by the method steps in FIG. 3. Computing device 500 also includes one or more network interfaces 540 for communicating with other devices via a network. Computing device 500 also includes one or more input/output devices 550 that enable user interaction with computing device 500 (e.g., display, keyboard, touchpad, buttons, etc.).

Processor 510 can include, among others, special purpose processors with software instructions incorporated in the processor design and general purpose processors with instructions in storage device 520 or memory 530, to control the processor 510, and may be the sole processor or one of multiple processors of computing device 500. Processor 510 may be a self-contained computing system, containing multiple cores or processors, a bus, memory controller, cache, etc. A multi-core processor may be symmetric or asymmetric. Processor 510, data storage device 520, and/or memory 530 may include, be supplemented by, or incorporated in, one or more application-specific integrated circuits (ASICs) and/or one or more field programmable gate arrays (FPGAs). It can be appreciated that the disclosure may operate on a computing device 500 with one or more processors 510 or on a group or cluster of computing devices networked together to provide greater processing capability.

Data storage device 520 and memory 530 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computing device, the computing device properly views the connection as a computer-readable medium. Thus, any such connection is properly termed a computer-readable medium. Combinations of the above should also be included within the scope of the computer-readable media.

Network/communication interface 540 enables the computing device 500 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 540 enables the computing device 500 to transfer data, synchronize information, update software, or any other suitable operation.

Input/output devices 550 may also include parts of a computing device, such as a smartphone having a camera, a touchscreen, a display, buttons, speakers, and the like. For example, input/output devices 550 may include a display device such as a liquid crystal display (LCD) monitor for displaying information to the user, touchscreen by which the user can provide input and output to the computing device 500, or a camera for capturing QR codes. Input/output devices 550 may include peripherals.

Any or all of the systems and apparatus discussed herein, including personal computers, tablet computers, hand-held devices, cellular telephones, servers, database, cloud-computing environments, and components thereof, may be implemented using a computing device such as computing device 500.

One skilled in the art will recognize that an implementation of an actual computing device or computer system may have other structures and may contain other components as well, and that FIG. 5 is a high level representation of some of the components of such a computing device for illustrative purposes.

While the invention described herein has been illustrated using golf, the system may also be used in other types of games that invoke multiple rounds with progress towards a goal. For example only, the invention described herein may apply to racing, croquet, and Frisbee golf.

The foregoing description of the preferred embodiments of the invention described herein has been presented for the purposes of illustration and description. It is not intended to be exhaustive, or to limit the invention to the precise form(s) disclosed. Many modifications and variations are possible in light of the above teaching. It is intended that the scope of the invention not be limited by this detailed description, but by the claims and the equivalents to the claims appended hereto.

What is claimed is:

1. A method for playing a virtual golf game for a plurality of users, comprising:
   a. providing a computer application for a computing device that when run by the computing device, causes the computing device to:
      i. manage a user account stored in a database and accessible from a server, wherein the user account comprises a user identification, a virtual currency amount associated with the user account, an avatar, and a progression system, wherein the avatar represents a user when playing the virtual golf game, wherein the avatar is customizable by a plurality of customization options, wherein customization options are purchasable from a virtual store, wherein the progression system provides rewards associated with the user account, and wherein the rewards comprise customization options;
      ii. play the virtual golf game, wherein the virtual golf game comprises a starting point, a play sequence, a bet sequence, a termination condition, and a resolution event;
         1. wherein the starting point comprises a display of a golf hole on a golf course, a display of each connected user playing in the game, a display of an ante requirement for each user to commence play on the golf hole, and a control option for each user to pay the ante requirement, wherein the ante of each user is virtually placed into a virtual pot when the each user confirms to proceed;
         2. wherein the play sequence comprises a display of a distance of each user to the golf hole, a control option to actuate a random number generator to effectuate a virtual golf shot by each user, wherein an outcome of each user's golf shot is dependent on the random number generator and a distance and a location of each user relative to the golf hole, wherein the distance and the location of each user relative to the golf hole is updated based on the outcome of the user's golf shot, and wherein the play sequence is repeated depending on a par of the hole and the outcome of each user's golf shot, wherein the computing device selects a table from a plurality of tables, the table comprising a list of numbers, each number corresponding to a possible shot outcome, wherein the random number generator randomly selects a number from the list of numbers from the table selected, wherein when the number is selected the possible shot outcome corresponding to the selected number becomes the outcome, wherein the table selected is determined by any one or more variables selected from the group consisting of the current location and distance from the hole, a club selected, and an environmental condition, wherein a combination of the probability of each possible outcome being selected is different for each table in the plurality of tables;
         3. wherein the bet sequence, which occurs prior to each user playing their respective golf shot, comprises a percentage likelihood that their respective golf shot will be holed out, and a plurality of wagering options for each user, including: (a) to become inactive, (b) match the wager by all other active users, or (c) raise the wager of one or more other active users, and wherein the bet sequence further comprises a timer for each user that automatically causes the user to become inactive if the user does not choose a wagering option within a predetermined time limit;
         4. wherein the play sequence and bet sequence alternate until the termination condition occurs, wherein the termination condition is one of the following: (a) one active user remaining at an end of a bet sequence or (b) at least one user having the lowest score on a golf hole, wherein if a termination condition occurs, then the system proceeds to the resolution event;
         5. wherein the resolution event comprises a display of each user and a display of a transfer of virtual currency from the virtual pot to at least one winner of the virtual golf game.

2. The method of claim 1, wherein the computer application further causes the computing device to play a virtual golf tournament, wherein the virtual golf tournament comprises a plurality of virtual golf games played in sequence, wherein each user enters the virtual golf tournament with a set amount of virtual currency, and wherein a winner is determined based on which user possesses the highest amount of virtual currency at an end of the virtual golf tournament.

3. The method of claim 1, wherein the computer application further causes the computing device to play a virtual golf tournament, wherein the virtual golf tournament comprises a plurality of virtual golf games played in a bracket format, wherein each user begins each of the plurality of virtual golf games with the same amount of currency as other users, and wherein a winner of each of the plurality of virtual golf games advances to a next round in the bracket format until only one user remains undefeated.

4. A system of playing a virtual golf game among a plurality of users comprising:
   a. a server;
   b. a database;
   c. a computing device comprising a display, at least one processor, memory, and at least one program, wherein the at least one program is stored in the memory and configured to be executed by the at least one processor, the at least one program including instructions to:
      i. manage a user account stored in the database and accessible from the server, wherein the user account comprises a user identification and a virtual currency amount associated with the user account;
      ii. play the virtual golf game, wherein the virtual golf game comprises a starting point, a play sequence, a bet sequence, a termination condition, and a resolution event;

1. wherein the starting point comprises a display of a golf hole on a golf course, a display of each connected user playing in the game, a display of an ante requirement for a user to commence play on the golf hole, and a control option for each user to pay the ante requirement, wherein the ante of each user is virtually placed into a virtual pot when the each user confirms to proceed;
2. wherein the play sequence comprises a display of a distance of each user to the golf hole, a control option to actuate a random number generator that determines an outcome of each user's golf shot, wherein the distance and a location of each user relative to the golf hole is updated based on the outcome of each user's golf shot, and wherein the play sequence is repeated depending on a par of the hole and the outcome of each user's golf shot, wherein the computing device selects a table from a plurality of tables, the table comprising a list of numbers, each number corresponding to a possible shot outcome, wherein the random number generator randomly selects a number from the list of numbers from the table selected, wherein when the number is selected the possible shot outcome corresponding to the selected number becomes the outcome, wherein the table selected is determined by any one or more variables selected from the group consisting of the current location and distance from the hole, a club selected, and an environmental condition, wherein a combination of the probability of each possible outcome being selected is different for each table in the plurality of tables;
3. wherein the bet sequence, which occurs prior to each user playing their respective golf shot, comprises a percentage likelihood that their respective golf shot will be holed out, and a plurality of wagering options for each user to become inactive, match the wager by all other active users, or raise the wager of one or more other active users;
4. wherein the play sequence and bet sequence alternate until the termination condition occurs, wherein the termination condition is one active user remaining at an end of a bet sequence or at least one user having the lowest score on a golf hole, and wherein if a termination condition occurs, then the system proceeds to the resolution event;
5. wherein the resolution event comprises a display of each user and a display of a transfer of virtual currency from the virtual pot to at least one winner of the virtual golf game.

5. The system of claim 4, wherein the bet sequence further requires a bet sequence ante.

6. The system of claim 5, wherein the bet sequence ante increases at least once during the virtual golf game.

7. The system of claim 4, wherein the outcome of each user's golf shot is further dependent on the distance and the location of each user relative to the golf hole.

8. The system of claim 4, wherein the at least one program further comprises instructions to play a virtual golf tournament, wherein the virtual golf tournament comprises a plurality of virtual golf games played in sequence, wherein each user enters the virtual golf tournament with a set amount of virtual currency, and wherein a winner is determined based on which user has the highest amount of virtual currency at the end of the virtual golf tournament.

9. The system of claim 4, wherein the at least one further comprises instructions to play a virtual golf tournament, wherein the virtual golf tournament comprises a plurality of virtual golf games played in a bracket format, wherein each user begins each of the plurality of virtual golf games with the same amount of currency as other users, and wherein a winner of each of the plurality of virtual golf games advances to a next round in the bracket format until only one user remains undefeated.

10. The system of claim 4, wherein the user account further comprises a progression system, wherein the progression system provides rewards associated with the user account, and wherein progression is, and rewards are, earned by playing the virtual golf game.

11. The system of claim 4, wherein the bet sequence further comprises a timer for each user that automatically causes the user to become inactive if the user does not choose a wagering option within a predetermined time limit.

12. A method for playing a virtual golf game for a plurality of users, comprising:
  a. providing a computer application for a computing device that when run by the computing device, causes the computing device to:
    i. manage a user account stored in the database and accessible from the server, wherein the user account comprises a user identification and a virtual currency amount associated with the user account;
    ii. play the virtual golf game, wherein the virtual golf game comprises a starting point, a play sequence, a bet sequence, a termination condition, and a resolution event;
      1. wherein the starting point comprises a display of a golf hole on a golf course, a display of each connected user playing in the game, a display of an ante requirement for each user to commence play on the golf hole, and a control option for each user to pay the ante requirement, wherein the ante of each user is virtually placed into a virtual pot when each user confirms to proceed;
      2. wherein the play sequence comprises a display of a distance of each user to the golf hole, a control option to actuate a random number generator that determines an outcome of each user's golf shot, wherein the distance and a location of each user relative to the golf hole is updated based on the outcome of each user's golf shot, and wherein the play sequence is repeated depending on a par of the hole and the outcome of each user's golf shot, wherein the computing device selects a table from a plurality of tables, the table comprising a list of numbers, each number corresponding to a possible shot outcome, wherein the random number generator randomly selects a number from the list of numbers from the table selected, wherein when the number is selected the possible shot outcome corresponding to the selected number becomes the outcome, wherein the table selected is determined by any one or more variables selected from the group consisting of the current location and distance from the hole, a club selected, and an environmental condition, wherein a combination of the probability of each possible outcome being selected is different for each table in the plurality of tables;
      3. wherein the bet sequence, which occurs prior to each user playing their respective golf shot, comprises a percentage likelihood that their respective golf shot will be holed out, and a plurality of wagering options for each user to become inactive, match the wager by all other active users, or raise the wager of one or more other active users;

4. wherein the play sequence and bet sequence alternate until the termination condition occurs, wherein the termination condition is one active user remaining at an end of a bet sequence or at least one user having the lowest score on a golf hole, and wherein if a termination condition occurs, then the system proceeds to the resolution event;

5. wherein the resolution event comprises a display of each user and a display of a transfer of virtual currency from the virtual pot to at least one winner of the virtual golf game.

13. The method of claim 12, wherein the bet sequence further requires a bet sequence ante.

14. The method of claim 13, wherein the bet sequence ante increases at least once during the virtual golf game.

15. The method of claim 14, wherein the outcome of each user's golf shot is further dependent on the distance and the location of each user relative to the golf hole.

16. The method of claim 13, wherein the outcome of each user's golf shot is further dependent on the distance and the location of each user relative to the golf hole.

17. The method of claim 12, wherein the outcome of each user's golf shot is further dependent on the distance and the location of each user relative to the golf hole.

18. The method of claim 12, wherein the computer application further causes the computing device to play a virtual golf tournament, wherein the virtual golf tournament comprises a plurality of virtual golf games played in sequence, wherein each user enters the virtual golf tournament with a set amount of virtual currency, and wherein a winner is determined based on which user has the highest amount of virtual currency at the end of the virtual golf tournament.

19. The method of claim 12, wherein the computer application further causes the computing device to play a virtual golf tournament, wherein the virtual golf tournament comprises a plurality of virtual golf games played in a bracket format, wherein each user begins each of the plurality of virtual golf games with the same amount of currency as other users, and wherein a winner of each of the plurality of virtual golf games advances to a next round in the bracket format until only one user remains undefeated.

* * * * *